(12) United States Patent
Ishii et al.

(10) Patent No.: US 10,324,449 B2
(45) Date of Patent: Jun. 18, 2019

(54) MOTOR CONTROLLING METHOD, CONTROL DEVICE AND MACHINE TOOL

(71) Applicant: MAKINO MILLING MACHINE CO., LTD., Tokyo (JP)

(72) Inventors: Kazunari Ishii, Kanagawa (JP); Masashi Nagaya, Kanagawa (JP)

(73) Assignee: MAKINO MILLING MACHINE CO., LTD., Tokyo (JP)

( * ) Notice: Subject to any disclaimer, the term of this patent is extended or adjusted under 35 U.S.C. 154(b) by 0 days.

(21) Appl. No.: 15/553,754

(22) PCT Filed: Feb. 27, 2015

(86) PCT No.: PCT/JP2015/055899
§ 371 (c)(1),
(2) Date: Aug. 25, 2017

(87) PCT Pub. No.: WO2016/135958
PCT Pub. Date: Sep. 1, 2016

(65) Prior Publication Data

US 2018/0032052 A1    Feb. 1, 2018

(51) Int. Cl.
*G05B 19/042*    (2006.01)
*B23Q 3/157*    (2006.01)
(Continued)

(52) U.S. Cl.
CPC .......... *G05B 19/402* (2013.01); *B23Q 3/157* (2013.01); *B23Q 3/15526* (2013.01);
(Continued)

(58) Field of Classification Search
CPC ................ G05B 19/402; G05B 19/416; G05B 2219/41398; B23Q 17/22; B23Q 3/157;
(Continued)

(56) References Cited

U.S. PATENT DOCUMENTS 8,716,972 B2 *    5/2014    Ohta .......................... H02P 3/00
                                                                    318/430
9,280,149 B2 *    3/2016    Sugihara ................ G05B 19/19
(Continued)

FOREIGN PATENT DOCUMENTS

JP        58-53733      3/1983
JP        3-142108      6/1991
(Continued)

OTHER PUBLICATIONS

International Search Report dated Apr. 28, 2015, directed to PCT Application No. PCT/JP2015/055899; 1 page.

*Primary Examiner* — Charles R Kasenge
(74) *Attorney, Agent, or Firm* — Morrison & Foerster LLP

(57) ABSTRACT

A method for controlling the motor of a tool magazine that rotates around a horizontal rotation axis is configured so that: at least two indexing positions for the tool magazine are determined; the load torque acting on the tool magazine when stopped at said indexing positions is measured; an unbalance torque, which is the load torque when stopped at the indexing position at which the load torque when stopped is maximal, is calculated from multiple load torques when stopped; and the servo motor for the tool magazine is controlled on the basis of the unbalance torque.

6 Claims, 6 Drawing Sheets

(51) Int. Cl.
*G05B 19/416* (2006.01)
*B23Q 16/02* (2006.01)
*B23Q 17/22* (2006.01)
*G01M 1/14* (2006.01)
*B23Q 5/34* (2006.01)
*G05B 19/402* (2006.01)
*B23Q 17/00* (2006.01)
*B23Q 3/155* (2006.01)
*B23Q 11/00* (2006.01)
*G01M 1/10* (2006.01)
*G05B 19/404* (2006.01)
*B23Q 11/08* (2006.01)

(52) U.S. Cl.
CPC .......... *B23Q 3/15722* (2016.11); *B23Q 5/34* (2013.01); *B23Q 11/0028* (2013.01); *B23Q 11/0891* (2013.01); *B23Q 16/02* (2013.01); *B23Q 17/00* (2013.01); *B23Q 17/22* (2013.01); *G01M 1/10* (2013.01); *G01M 1/14* (2013.01); *G05B 19/404* (2013.01); *G05B 19/416* (2013.01); *B23Q 3/15713* (2013.01); *B23Q 16/025* (2013.01); *G05B 2219/41398* (2013.01)

(58) Field of Classification Search
CPC .......... B23Q 17/00; B23Q 16/02; B23Q 5/34; G01M 1/14
See application file for complete search history.

(56) References Cited

U.S. PATENT DOCUMENTS

2007/0097566 A1* 5/2007 Woods .................. B24B 23/028
361/33
2012/0229069 A1* 9/2012 Ohta ........................ H02P 3/00
318/601
2014/0217951 A1* 8/2014 Sugihara ................ G05B 19/19
318/600

FOREIGN PATENT DOCUMENTS

| | | |
|---|---|---|
| JP | 2001-62672 | 3/2001 |
| JP | 2005-224896 | 8/2005 |
| JP | 2009-34794 | 2/2009 |

* cited by examiner

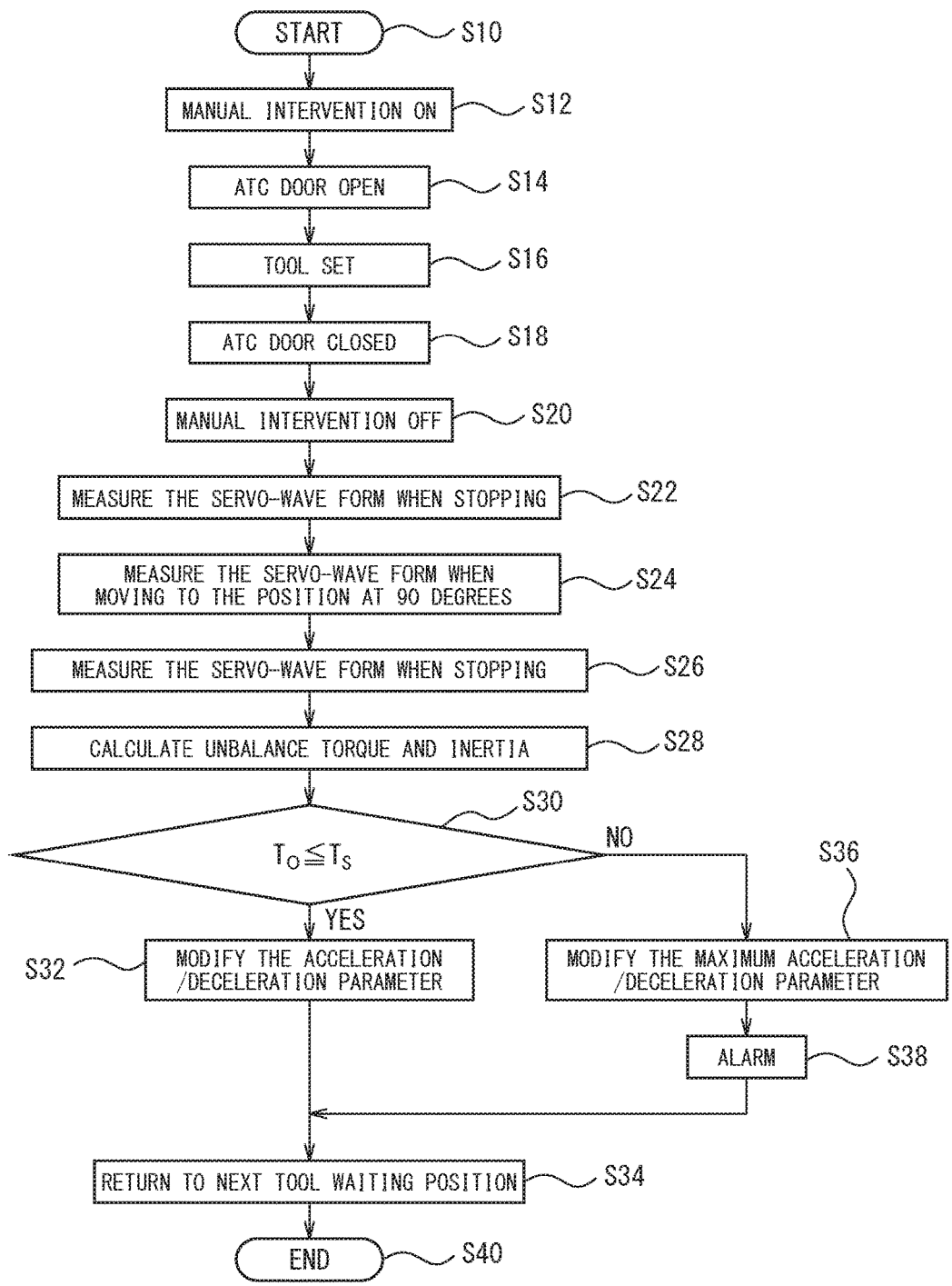

MOTOR CONTROLLING METHOD, CONTROL DEVICE AND MACHINE TOOL

CROSS-REFERENCE TO RELATED APPLICATION

This application is a U.S. National Stage Application of International Patent Application No. PCT/JP2015/055899, filed on Feb. 27, 2015, which is hereby incorporated by reference in the present disclosure in its entirety.

FIELD OF THE INVENTION

The invention relates to a method for controlling a motor in consideration of unbalance torque, a control device for carrying out the method and a machine tool provided with a tool magazine.

BACKGROUND OF THE INVENTION

Patent Literature 1 describes a method for controlling a motor wherein the moment of inertia and the unbalance torque of a tool magazine are estimated based on the shapes and the distribution of the tools mounted to the tool magazine, and the optimum acceleration is determined by adding/subtracting the unbalance torque.

PATENT PUBLICATIONS

Patent Literature 1: JP-A-2005-224896

BRIEF SUMMARY OF THE INVENTION

According to the invention of Patent Literature 1, the shapes and the distribution of the tools mounted to the tool magazine must be previously known, and therefore when an operator of the machine tool has replaced the tools, the acceleration/deceleration parameter cannot be automatically revised.

The invention is directed to solve the prior art problem, and the objective of the invention is to ensure the estimation of the unbalance torque in a rotating shaft apparatus in which the load torque is changed by moving unevenly distributed masses, whereby reducing the movement duration of the rotating shaft apparatus.

In order to achieve the above described object, according to the invention, a method of controlling a motor of a rotating shaft apparatus configured to rotate about a horizontal or inclined rotational axis, comprising the steps of positioning the rotating shaft apparatus at at least two rotational positions, measuring stopping load torque acting on the rotating shaft apparatus at each of the rotational positions, calculating unbalance torque which is the stopping load torque at one of the rotational positions where the stopping load torque is the maximum, based on the stopping load torques, and controlling the motor of the rotating shaft apparatus based on the unbalance torque is provided.

Further, according to the invention, an apparatus for controlling a motor of a rotating shaft apparatus configured to rotate about a horizontal or inclined rotational axis, comprising means for positioning the rotating shaft apparatus at at least two rotational positions, means for measuring stopping load torque acting on the rotating shaft apparatus at each of the rotational positions, and means for calculating unbalance torque which is the stopping load torque at one of the rotational positions where the stopping load torque is the maximum, based on the stopping load torques, whereby the motor of the rotating shaft apparatus is controlled based on the unbalance torque is provided.

According to the invention, the stopping load torques are measured, and the unbalance torque, which is the stopping load torque at one of the rotational positions where the stopping load torque is the maximum, is calculated, so that the motor of the rotating shaft apparatus is optimally controlled, based on the unbalance torque, whereby enabling to increase the driving speed of the rotating shaft apparatus, and reducing the sudden changes in the driving speed.

BRIEF DESCRIPTION OF THE DRAWINGS

FIG. 8 is a flowchart that shows the control method of the motor.

DETAILED DESCRIPTION OF THE INVENTION

With reference to the drawings, a preferred embodiment of the invention will be described below.

Figure 1:
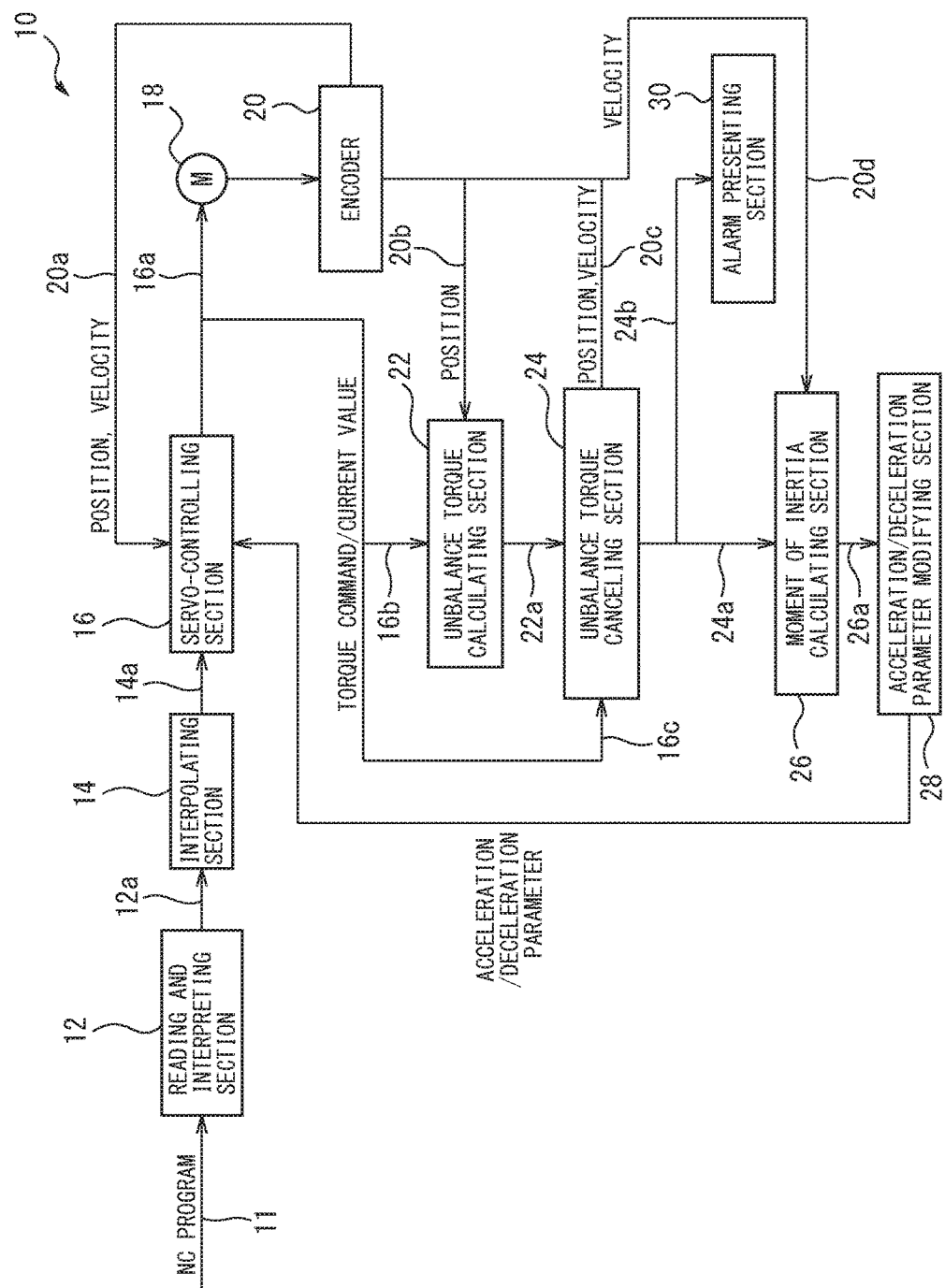
FIG. 1 is a block diagram showing an embodiment of a motor control device according to the invention.
Figure 2:
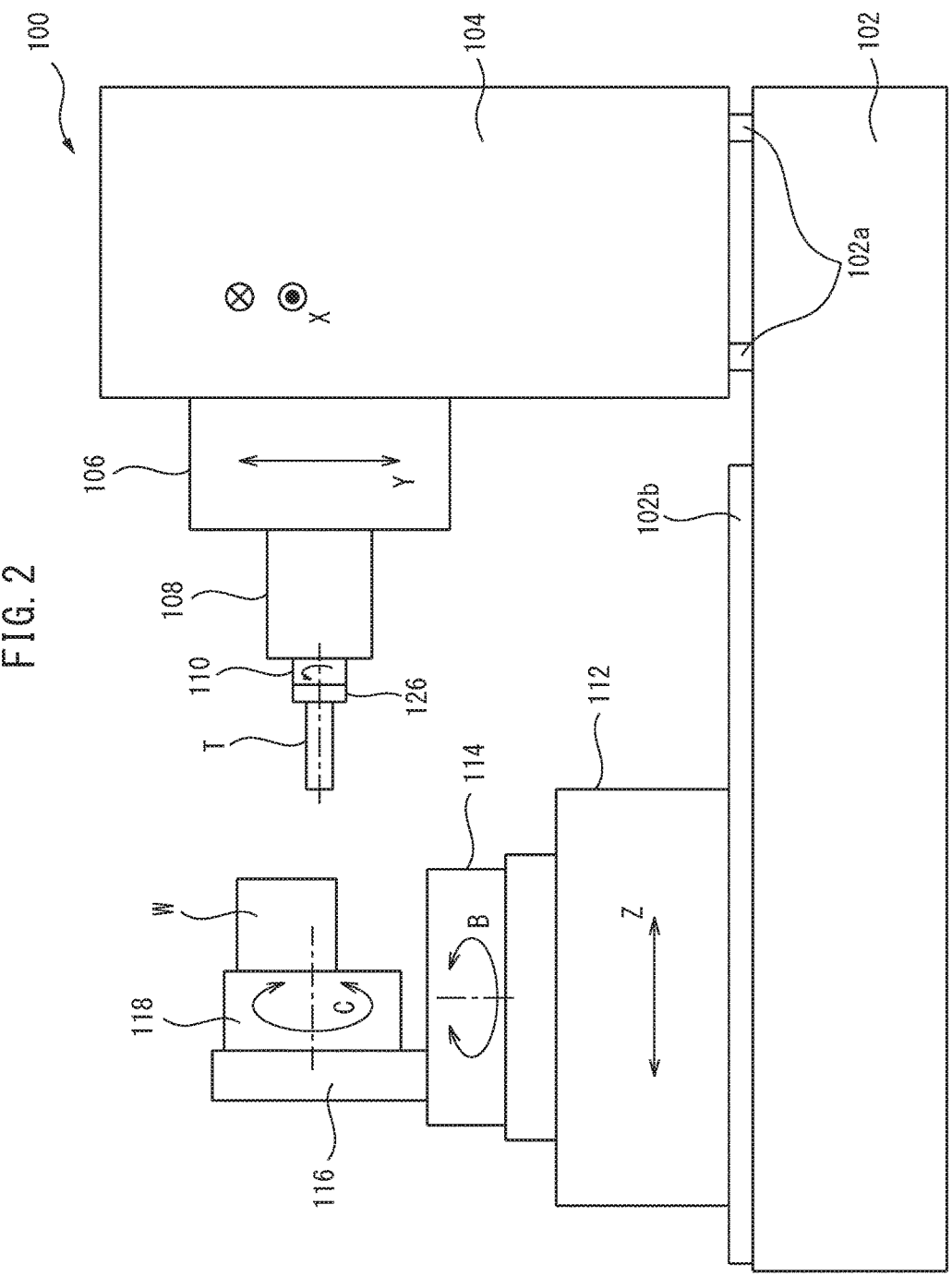
FIG. 2 is a side view showing an example of a machine tool to which the invention is applied.

With reference to FIG. 2, showing an example of a machine tool to which the invention is applied, the machine tool 100 forms a horizontal machining center, and comprises a bed 102, providing a base fixed to a floor of a factory, a Z-axis slider 112 provided for reciprocating along a pair of Z-axis guide rails 102b, extending in a front-rear direction or a Z-axis direction (the left and right direction in FIG. 1), on a top face of a front part (the left side in FIG. 2) of the bed 102, a rotary table 114 provided for rotationally feeding in a B-axis direction about a vertical axis, on a top face of the Z-axis slider 112, a column 104 provided for reciprocating along a pair of X-axis guide rails 102a extending in a left-right direction or an X-axis direction (perpendicular direction to the plane of FIG. 1), on a top face of a rear part (the right side in FIG. 1) of the bed 102, a Y-axis slider 106 provided for reciprocating along Y-axis guide rails (FIG. 3) extending in a vertical direction or a Y-axis direction on a front face of the column 104. A spindle head 108, configured to support a spindle 110 for rotation about a horizontal axis $O_s$, is mounted to the Y-axis slider. Further, the machine tool 100 comprises an X-axis feed device (not shown) configured to drive the column 104 in the X-axis direction, a Y-axis feed device (not shown) configured to drive the Y-axis slider 106 in the Y-axis direction, and a Z-axis feed device (not shown) configured to drive the Z-axis slider 112 in the Z-axis direction. A C-axis table 118 is mounted to the rotary table 112 via a mount 116. A workpiece W is mounted to the C-axis table 118 so as to face a tool T attached to the end of the spindle 110.

Figure 3:
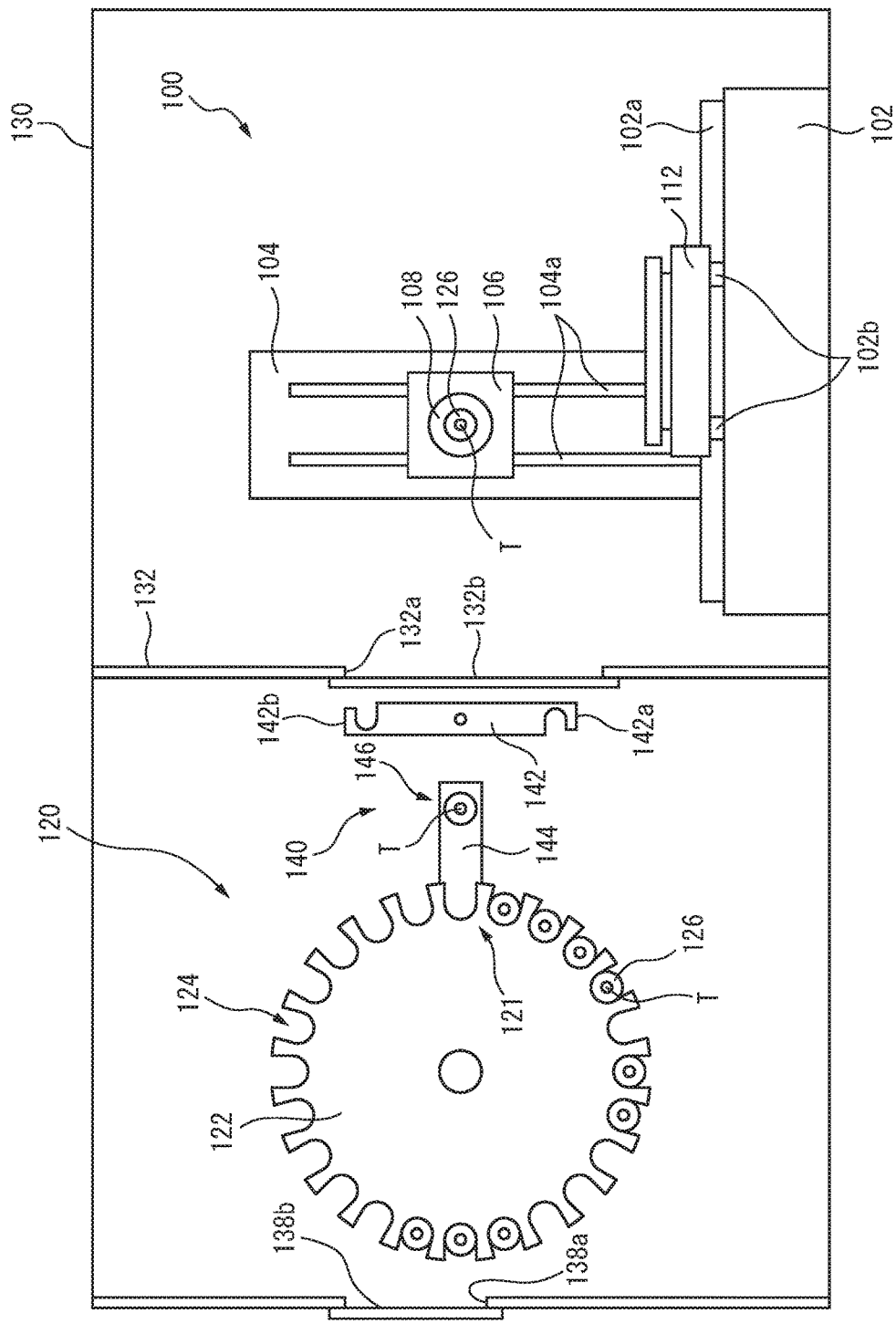
FIG. 3 is a front view of the machine tool of FIG. 2.

With reference to FIG. 3, the horizontal machining center formed by the machine tool 100 comprises a tool magazine 120 configured to accommodate a plurality of tools necessary for the process in the machine tool 100, a tool changer configured to change a tool T attached to the end of the spindle 110 of the machine tool 100 with one of the tools accommodated in the tool magazine 120 in accordance with a command from an NC device (not shown) of the machine tool 100. The machine tool 100, the tool magazine 12 and the tool changer 140 are enclosed by a cover 130. In this embodiment, the tool magazine 120 provides a rotating shaft apparatus.

The cover 130 comprises a partition 132 configured to divide the interior space of the cover into a processing chamber 134 and a tool accommodating chamber 136. The machine tool 100 is placed in the processing chamber for machining a workpiece, while the tool magazine and the tool changer 140 are placed in the tool accommodating chamber 136. The partition 132 defines an opening 132a allowing a tool to be transported between the processing chamber 134 and the tool accommodating chamber 136. The partition 132 is provided with a shutter 132b configured to open and close the opening 132a. The cover 130 defines an opening 138a for allowing an operator to access the tool accommodating chamber 136 to mount tools onto the tool magazine 120 and to remove tools from the tool magazine. The opening 138a is opened and closed by an ATC door 138b. New tools are mounted to the tool magazine 120, and used tools are removed from the tool magazine 120 by an operator of the machine tool 100, after opening the ATC door 138b of the cover 130, whereby the tools are exchanged.

The tool magazine 120 comprises a base member 122 in the formed of a circular plate. The base member 122 has a plurality of receptacles 124 of recesses which open outwardly in the radial directions, and are equally disposed at an angle in the peripheral direction. A tool is held in each of the receptacles 124 via a tool holder 126. The tool magazine 120 is supported, for rotating within a vertical plane, by a supporting structure such as a frame (not shown) via a rotating shaft 120a which is held horizontally. The rotating shaft 120a is coupled with an output shaft of a servomotor 18 (FIG. 1) for rotationally driving the tool magazine 120.

The tool changer 140 is disposed between the tool magazine 120 and the machine tool 100, and provided with a changing arm 142 and a shifter 144. Provided at the either ends of the changing arm 142 are grippers 142a and 142b each of which is configured to hold a tool. The changing arm 142 is capable of liner movement, i.e., advancing and retracting along the rotational axis $O_s$ of the spindle 110, and rotational movement, i.e., rotating by 90° or 180° within a plane perpendicular to the rotational axis $O_s$ of the spindle 110.

The shifter 144 is configured to horizontally reciprocate between the tool magazine 120 and the changing arm 142. The shifter 144 receives a tool, which is located at a waiting position 121 of the tool magazine 120, from the tool magazine 120 and transfers the tool to a tool handover position 146. Further, the shifter 144 receives a tool at the handover position 146 from the changing arm 142 and inserts the tool into one of the receptacles 124 positioned at the waiting position 121.

FIG. 1 is a block diagram showing an embodiment of the control device for the servomotor 18 for driving the tool magazine 120. The control device 10 for the servomotor 18 may be formed, for example, as a part of an NC device (not shown) for the machine tool 100, and comprises a reading and interpreting section 12, an interpolating section 14, a servo-controlling section 16, an unbalance torque calculating section 22, an unbalance torque canceling section 24 and an acceleration/deceleration parameter modifying section 28.

The control device 10 performs a feedback control similar to typical servo-controlling devices. The reading and interpreting section 12 reads and interprets an NC program which is input through input means 11, for example a network means such as a LAN, a key board, or a touch panel, and outputs operation commands 12a to the interpolating section 14. The operation commands 12a include a movement command for moving the receptacle 124, into which a tool need for the next process is inserted, to the waiting position. The interpolating section 14 interpolates the received operation commands 12a based on a interpolative function, and outputs position commands (pulse position commands) 14a suitable for a predetermined rotational velocity to the servo-controlling section 16. The servo-controlling section 16 outputs, based on the received position commands 14, an electric current value as a torque command for rotating the tool magazine 120 to the servomotor 18. The rotational position and velocity 20a of the servomotor 18 are fed back to the servo-controlling section 16 from an encoder (rotary encoder) 20 of the servomotor 18.

During the above described replacement of the tools, an operator does not consider the positions of the tools in the peripheral direction of the tool magazine 120, whereby the tools are not distributed evenly in the peripheral direction of the tool magazine 120, and the tools are often mounted biasedly in the peripheral direction of the tool magazine 120 as shown in FIG. 3. When the tools are unevenly distributed, a torque or moment (hereinafter, referred to as unbalance torque), based on the gravity forces of the tools, is acting on the tool magazine 120.

With reference to FIGS. 4-7, the unbalance torque will be described below.

Figure 4:
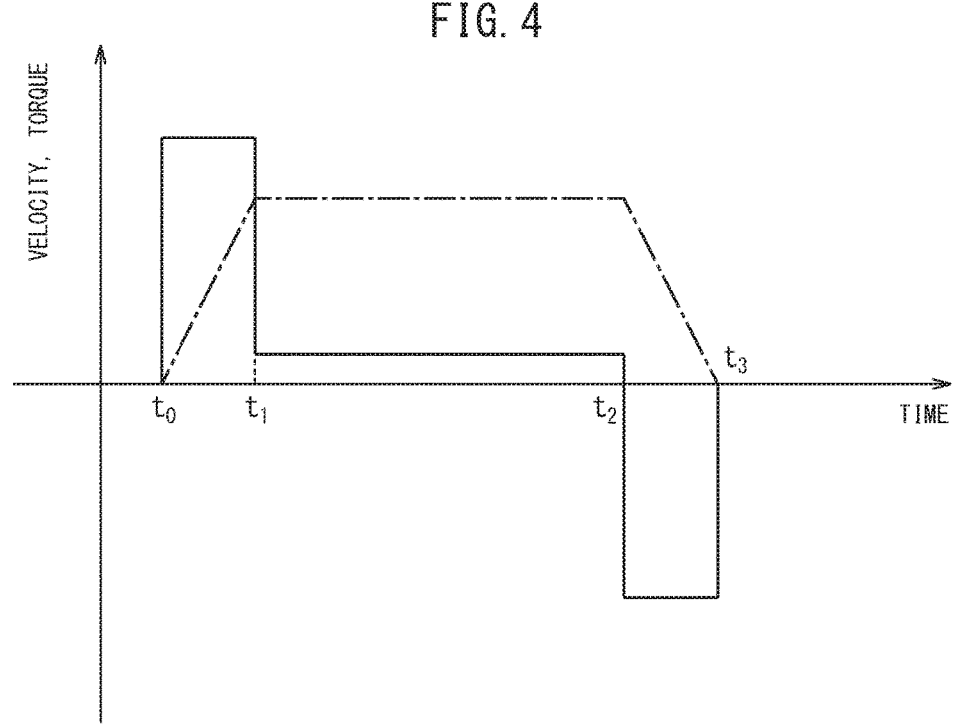
FIG. 4 is a graph showing the velocity and torque when rotationally driving a rotating body, on which unbalance torque is not acted.

FIG. 4 is a graph showing the velocity (dotted line) of a rotating body, such as the tool magazine 120, configured to rotate about a rotational axis, and the torque (thin line) applied to the rotating body, when the rotating body is rotationally driven, wherein an unbalance torque is not acting on the rotating body. In the graph of FIG. 4, the rotational velocity of the rotating body is increased at a constant acceleration from time $t=t_0$, during which a constant torque is applied to the rotating body. From $t=t_1$ to $t=t_2$, the rotating body rotates at a constant velocity, during which a torque $\tau=\tau'$, corresponding to the frictional force (the Coulomb's force and the viscosity of the lubricant) acting on the rotating body is applied. From $t=t_2$ to $t=t_3$, the rotational velocity is decreased at a constant deceleration, during which a negative torque is applied to the rotating body.

Figure 5:
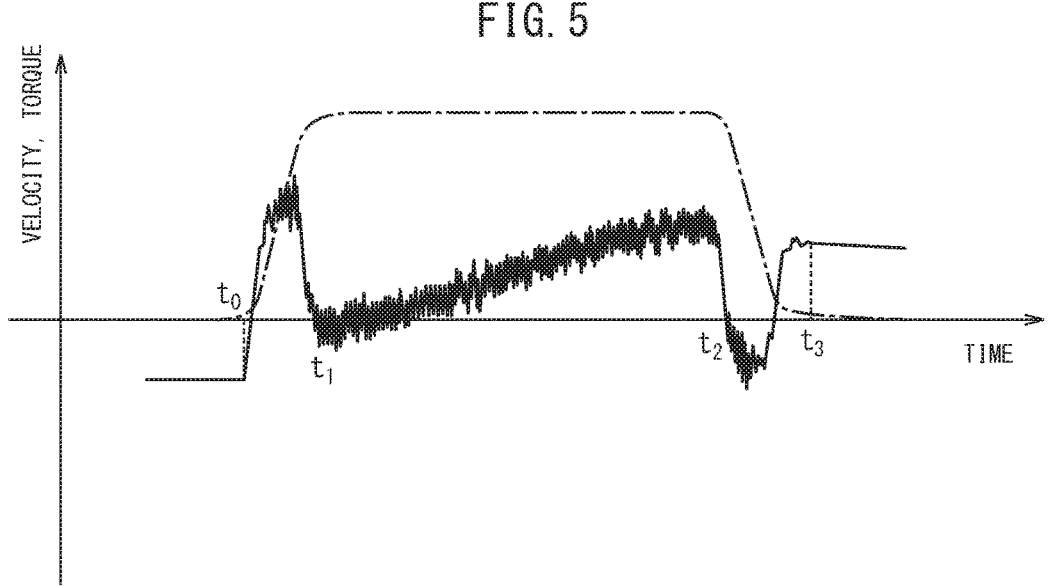
FIG. 5 is a graph showing the velocity and torque when rotationally driving a rotating body, on which unbalance torque is acted.

When the tool magazine 120, to which the tools are attached unevenly in the peripheral direction (FIG. 3), rotates about a horizontal or an inclined rotational axis so that the gravity force is affected, Unbalance torque is acting on the rotating body. For example, when the rotating body is rotationally driven with the velocity variation, as shown in FIG. 4, the torque, actually applied to the rotating body, is increased or decreased as a whole, as shown in FIG. 5 in which the torque is not constant between $t=t_1$ to $t=t_2$, during which the velocity is constant and changed (increased) with the time. If such an unbalance torque is not considered, then problems that sufficient velocity is not obtained or the velocity is changed suddenly will be raised, even if the servomotor 18 is feedback-controlled.

In order to solve such problems, according to the embodiment, the unbalance torque calculating section 22 receives torque command or electric current value 16b, output from the servo-controlling section 16, and position information 20b output from the encoder 20, and calculates the unbalance torque acting on the tool magazine 120. Then, the unbalance torque canceling section 24 receives the unbalance torque 22a, calculated by the unbalance toque calculating section 22, the torque command or the electric current value 16c from the servo-controlling section 16, and the position and velocity information 20c from the encoder 20, and corrects the torque 16b so as to cancel the unbalance torque. The acceleration/deceleration parameter modifying section 28 receives, from the unbalance section canceling section 24, the torque 24a corrected by the unbalance torque canceling section 24 and the position and velocity information 20c which the unbalance torque canceling section 24 has received from the encoder 20, and calculates the moment of inertia of the tool magazine 120 based on the corrected torque 24a. The acceleration/deceleration modifying section 28 receives the moment of inertia of the tool magazine 120 from the moment of inertia calculating section 26, and outputs acceleration/deceleration parameter to the servo-controlling section 16, after modifying (correcting) the acceleration/deceleration parameter, whereby the electric current value 16a, output from the servo-controlling section 16 to the servomotor 18, is optimized. Further, the control device 10 may be provided with an alarm presenting section 30 configured to present acoustic or visual alarm or caution when the unbalance torque calculated by the unbalance torque calculating section 22 exceeds a predetermined upper limit.

Figure 6:
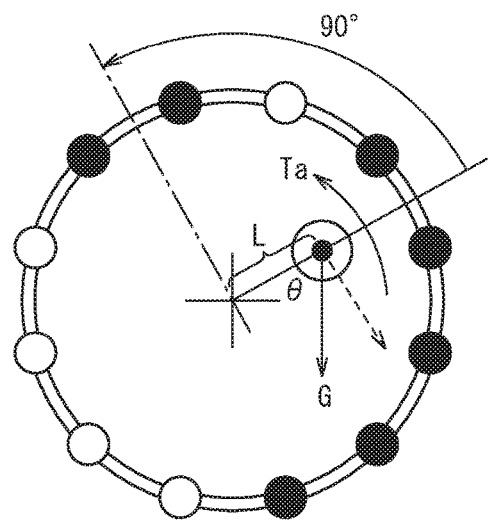
FIG. 6 is a schematic illustration showing the unbalance torque acting on the tool magazine to which the tool is mounted unevenly in the peripheral direction.
Figure 7:
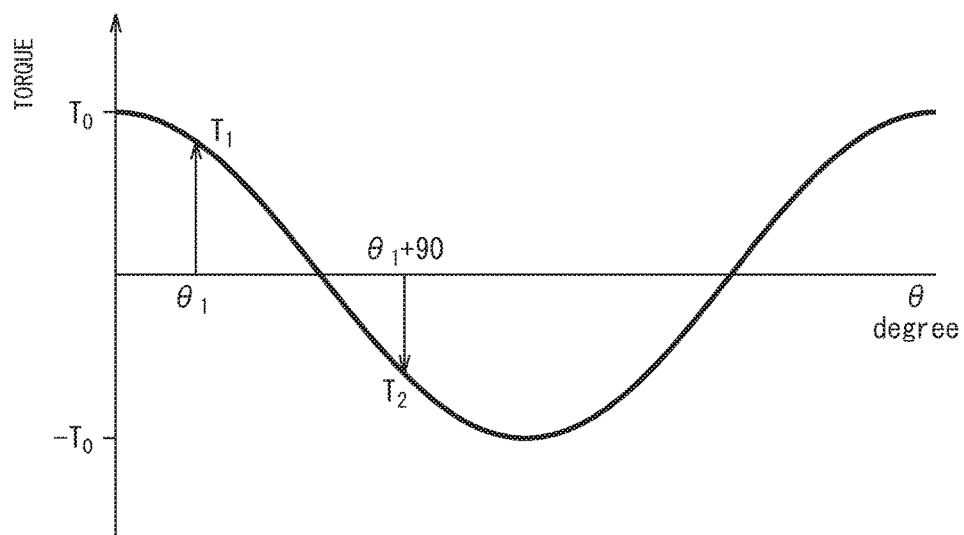
FIG. 7 is a graph showing the changes in the unbalance torque relative to the rotational position of a rotating body when rotating the rotating body on which the unbalance torque shown in FIG. 6 is acted.

With reference to FIGS. 6 and 7, the method for measuring and calculating the unbalance performed by the unbalance torque calculating section 22 will be described below. FIG. 5 is a schematic illustration of the tool magazine 120, wherein the filled circles denote ones of the receptacles 124 of the tool magazine 120 in which tools are held. FIG. 7 shows the changes in the unbalance torque relative to the rotational angle of the tool magazine.

As shown in FIG. 6, when the tools T are attached to the tool magazine 120 unevenly in the peripheral direction, the center of gravity of the tool magazine is moved to a position deviated by length L from the center of the base member 122 of the tool magazine 120. Accordingly, if the tools are unevenly distributed in the peripheral direction of the base member 122, the center of the gravity is deviated from the center, whereby a load torque is applied to the tool magazine to rotate the tool magazine. Here, the gravity force acting on the tool magazine 120, including the base member 122 and the tools attached to the base member 122, is assumed to be G. The rotational angle of the tool magazine 120 is assumed to be $\theta=0°$, when the center of gravity is at three o'clock relative to the center of the tool magazine 120. When the rotational angle is $\theta=0°$ or $\theta=18°$ C., the stopping load torque $T_0$ will become the maximum, i.e., $T_0=GL$.

Here, $T_1$: Unbalance torque
L: Length from the center of tool magazine 120 to the center of gravity.

Referring to FIG. 6, the stopping load torque T is generally presented by the following equation.

$$T=T_0 \cos \theta \quad (1)$$

Therefore, when stopped at a position rotated by $\theta=\theta_1$ from the rotational angle of $\theta=0°$, the stopping load torque $T_1$ applied to the tool magazine 120 can be calculated by the following equation.

$$T_1=T_0 \cos \theta_1 \quad (2)$$

When tool magazine 120 is stopped at a position further rotated 90° from the rotational position $\theta=\Phi$, the stopping load torque $T_2$ applied to the tool magazine 120 can be calculated by the following equation.

$$T_2=T_0 \cos(\theta_1+90)=T_0 \sin \theta_1 \quad (3)$$

Further, the formula of triangular function gives the following equation.

$$\sin^2\theta_1+\cos^2\theta_1=1 \quad (4)$$

Therefore, based on the equations (1)-(4), the unbalance torque $T_0$ or the maximum stopping load torque can be calculated from the following equation.

$$T_0=(T_1^2+T_2^2)^{1/2} \quad (5)$$

Furthermore, from equation (2), the initial phase $\theta_1$ is obtained from the following equation.

$$\theta_1=\arccos(T_1/T_0) \quad (6)$$

In this connection, it should be noted that although the stopping load torque is measure at two measuring points which are apart from each other by 90° in the peripheral direction about the center of the rotating shaft 120a in the present embodiment, the invention is not limited to this configuration. The measuring points may be apart from each other by an angle greater than 90°. Further, the measuring point is not limited to a single point, and the measurement may be carried out at a the stopping load torque may be measured at a plurality of points.

With reference to the flow chart show in FIG. 8, the method for measuring and calculating the unbalance torque will be described more concretely below.

The unbalance torque may be measured and calculated when tools are replaced as described above. When the operator of the machine tool 100 starts to replace the tools (Step S10), the tool accommodating chamber 136 is put into a state allowing manual intervention by the operator (Step S12). This may be carried out by depressing a press button (not shown) provided on an operating panel (not shown) of the machine tool 100, whereby an automatic movement of the machine tool 100, which is not anticipated by the operator, is inhibited when the operator accesses the tool magazine 120.

Then, after the operator opens the ATC door 138a (Step S14), the operator accesses the tool magazine 120 in order to replace the tools (Step S16). Then, after the ATC door 138a is closed (Step S18), the intervention to the NC device is disengaged (Step S20) by depressing a press button provided on the operating panel (not shown) of the machine tool 100.

After the intervention to the NC device is disengaged, the NC device reads a program for measuring the unbalance torque of the tool magazine 120 to start the measurement of the unbalance torque. The unbalance torque calculating section 22 reads the electric current value 16b presently supplied to the servomotor 18, which keeps the tool magazine 120 stopped (Step S22). The torque ($T_1$) (stopping load torque) necessary to keep the tool magazine stopped against the unbalance torque can be obtained based on the read electric current value 16b. Then, after the tool magazine 120 is rotated by 90° (Step S24), the electric current value 16b, necessary to keep the tool magazine 120 at the rotational position, is read from the servo-controlling section 16 (Step S26). The torque ($T_2$) (stopping load torque) necessary to keep the tool magazine stopped against the unbalance torque can be obtained based on the read electric current value 16b.

Then, at Step S28, the unbalance torque calculating section 22 calculates the maximum unbalance toque $T_0$, from equation (6), based on the two torque values ($T_1$, $T_2$) and equation (5), and the initial phase $\theta_1$.

Then, the torque canceling section 24 calculates, based on unbalance torque $T_0$ calculated by the unbalance toque calculating section 22, the initial phase $\theta_1$ and the position information read from the encoder 20, the stopping load torque T from following equation (7), when the tool magazine 120 is at an angular position $\theta$.

$$T = T_0 \cos(\theta_1 + \theta) \quad (7)$$

The unbalance torque canceling section 24 further receives the electric current value or the torque value 16c, supplied to the servomotor 18 of the tool magazine 120, from the servo-controlling section 16, and calculates torque $\tau$ by subtracting the unbalance torque $T_0$ therefrom.

Furthermore, at Step S28, the moment of inertia calculating section 26 calculates total moment of inertia J of the tool magazine 120, including the base member 122 and the tools attached to the base member 122, based on the following method.

Following equation (8) presents the relation between the torque $\tau$ (load torque on motion) and the moment of inertia of the tool magazine 120, when the servomotor 18 rotates.

$$\tau = J\alpha + DV + Fu \quad (8)$$

Here,
J: Moment of Inertia
$\alpha$: Angular Acceleration
D: Viscous Damping Coefficient
V: Angular Velocity
F: Coulomb Friction Torque
u: Unit Vector Indicating the Direction of Velocity The angular velocity V and the angular acceleration $\alpha$ can be calculated by the moment of inertia calculating section 26 based on the rotational velocity 20d of the servomotor 18. The unit vector u indicating the direction of velocity is positive when the tool magazine 120 rotates in one of the two rotational directions, and negative when rotating in the other direction. The variables to be obtained, when the tool magazine 120 rotates, are presented by the following equations.

$$(\tau_n) = (\tau_0, \tau_1, \tau_2 \ldots \tau_k, \tau_{k+1} \ldots \tau_m)(n=0\sim m) \quad (9)$$

$$(V_n) = (V_0, V_1, V_2 \ldots V_k, V_{k+1} \ldots V_m)(n=0\sim m) \quad (10)$$

$$(\alpha_n) = (\alpha_0, \alpha_1, \alpha_2 \ldots \alpha_k, \alpha_{k+1} \ldots \alpha_m)(n=0\sim m) \quad (11)$$

$$(u_n) = (u_0, u_1, u_2 \ldots u_k, u_{k+1} \ldots u_m)(n=0\sim m) \quad (12)$$

Accordingly, the values of the torque (load torque on motion) $\tau$, the values of the angular velocity V, the values of the angular acceleration $\alpha$, and the unit vectors u indicating the velocity directions can be read by the moment of inertia calculating section 26 at Steps S22 to S26. Then, the moment of inertia J, the viscous damping coefficient D and the coulomb friction torque F of the tool magazine 120 are calculated so that the difference between the sum of squares of the torque $\tau_n$, presented by equation (9), and the sum of squares of the torque $\tau$ which is obtained by substituting the variables presented by equations (10), (11) and (12) into equation (8) is the minimum. Accordingly, these variables are calculated by a least squares method. Thus, the moment of inertia J of the tool magazine 120 is calculated by the moment of inertia calculating section 26. The moment of inertia J, calculated by the moment of inertia calculating section 26, includes the moment of inertia based on the masses of the base member 122 of the tool magazine 120 and the tools mounted to the tool magazine 120.

Then, at Step S30, it is determined as to whether or not the unbalance torque $T_0$ exceeds a predetermined threshold value $T_s$. If the unbalance torque $T_0$ exceeds the predetermined threshold value Ts (NO at Step S30), then the acceleration/deceleration parameter modifying section 28 maximizes the acceleration/deceleration parameter, outputs it to the servo-controlling section 16, and outputs a command to the alarm presenting section 30 to present acoustic or visual alarm or caution indicating that the unbalance torque $T_0$ exceeds the predetermined threshold value. The acceleration/deceleration parameter includes the acceleration or gain.

If the unbalance torque does not exceeds the predetermined threshold value Ts (YES at Step S30), then the acceleration/deceleration parameter modifying section 28 outputs modified acceleration/deceleration parameter to the servo-controlling section 16. The modification of the acceleration/deceleration parameter is performed similar to the modification which is performed when the moment of inertia is increased, wherein the increase in the value of the unbalance torque $T_0$ of the tool magazine 120 is interpreted into the increase in the moment of inertia of the tool magazine 120. In particular, moment of inertial correction values are associated with the respective values of the unbalance torque $T_0$, and stored in the form of a table in a memory region of the control device 10, whereby the moment of inertial correction value is read from the table according to the value of the unbalance torque $T_0$. The moment of inertial correction values to be added to the moment of inertia according to the increase in the unbalance torque $T_0$ may be precedingly and experimentally obtained, and a table may be created and stored so as to associate the values of the unbalance torque $T_0$ with the moment of inertia correction values. The acceleration/deceleration parameters are associated with respective values obtained by adding the moment of inertial correction values to the moments of inertia, and stored in the form of a table in a memory region of the control device 10, whereby the acceleration/deceleration parameter is read from the table according to the value obtained by adding the moment of inertial correction value to the moment of inertia. The acceleration/deceleration parameter is modified according to the values of the moment of inertia and the unbalance torque $T_0$, whereby enabling more quick acceleration/deceleration, when the moment of inertia and the unbalance toque $T_0$ are small, and whereby the tool magazine 120 can be positioned in a shorter time.

In the above described embodiment, while the motor controlling method according to the invention controls the drive motor for the tool magazine, the invention is not limited to this, and can be applied to a rotary feed shaft rotating about a horizontal or inclined rotational axis. For example, in a machine tool shown in FIG. 2, the C-axis rotary table 118 may be controlled by the method of the invention. In this case, the center of gravity of the workpiece 116 attached to the C-axis table 118 is generally deviated from the rotational axis of the C-axis feed shaft, and therefore the present invention can be applied to the axis feed shaft.

REFERENCE SIGNS LIST

10 Control Device
18 Servomotor

20 Encoder
20a Rotating Velocity
20b Position Information
20c Velocity Information and Position Information
20d Rotating Velocity
22 Unbalance Torque Calculating Section
22a Unbalance Torque
24 Unbalance Torque Canceling Section
100 Machine Tool
120 Tool Magazine
120a Rotating Shaft
136 Tool Accommodating Chamber

The invention claimed is:

1. A method of controlling a motor of a rotating shaft apparatus configured to rotate about a horizontal or inclined rotational axis, comprising the steps of:
   positioning the rotating shaft apparatus at two rotational positions which are apart from each other by 90° around the rotational axis;
   measuring stopping load torque acting on the rotating shaft apparatus at each of the rotational positions;
   calculating unbalance torque which is the stopping load torque at one of the rotational positions where the stopping load torque is the maximum, as a square root of a sum of squares of the stopping load torques at the two rotational positions; and
   controlling the motor of the rotating shaft apparatus based on the calculated unbalance torque.

2. The method of controlling a motor according to claim 1, wherein the rotational position, where the stopping load torque is the maximum, is determined based on the measured stopping load torque, wherein the stopping load torque is calculated at each rotational phase of the rotating shaft apparatus, wherein the unbalance torque at each rotational phase is subtracted from the measured load torque on motion, whereby moment of inertia of the rotating shaft apparatus is calculated based on the load torque on motion excluding the unbalance torque.

3. The method of controlling a motor according to claim 2, wherein moment of inertia correction value, which is precedingly set, is added to the calculated motion of inertia, according to the value of the unbalance torque, wherein the acceleration/deceleration parameter of the rotating shaft apparatus is determined based on the motion of inertia to which the correction value is added.

4. The method of controlling a motor according to claim 1, wherein alarm or caution is generated when the unbalance torque exceeds a predetermined threshold value.

5. A device for controlling a motor of a rotating shaft apparatus configured to rotate about a horizontal or inclined rotational axis, the device comprising a non-transitory storage medium storing a program, the program, when executed by a computer, performing the steps of:
   positioning the rotating shaft apparatus at two rotational positions which are apart from each other by 90° around the rotational axis;
   measuring stopping load torque acting on the rotating shaft apparatus at each of the rotational positions;
   calculating unbalance torque which is the stopping load torque at one of the rotational positions where the stopping load torque is the maximum, as a square root of a sum of squares of the stopping load torques at the two rotational positions; and
   controlling the motor of the rotating shaft apparatus based on the calculated unbalance torque.

6. A machine tool comprising a tool magazine controlled by the device for controlling a motor according to claim 5.

* * * * *